United States Patent

Lovett

[15] 3,673,373
[45] June 27, 1972

[54] WELD SUPPORT FOR WELDING APPARATUS

[72] Inventor: Donald S. Lovett, Charleroi, Pa.
[73] Assignee: McGraw-Edison, Elgin, Ill.
[22] Filed: Feb. 10, 1971
[21] Appl. No.: 114,301

[52] U.S. Cl. ............................................................. 219/74
[51] Int. Cl. .......................................................... B23k 9/16
[58] Field of Search ........................ 219/74, 75, 130, 136, 127

[56] References Cited

UNITED STATES PATENTS

| | | | |
|---|---|---|---|
| 1,749,765 | 3/1930 | Henderickson | 219/74 |
| 2,590,084 | 3/1952 | Bernard | 219/74 X |

Primary Examiner—C. L. Albritton
Attorney—Richard C. Ruppin

[57] ABSTRACT

A weld support for a gas shielded metal arc welding apparatus is disclosed as having a welding block provided with a relatively flat surface, a resilient rubber strip around the periphery of the flat surface, a welding chamber within the block and a plurality of gas exhaust passages connecting the welding chamber and the exterior of the block and having bends intermediate their extremities. A shielding chamber is affixed to the welding block around an opening into the welding chamber for receiving and holding a nozzle of the welding apparatus perpendicular to the flat surface of the welding block and enclosing shielding gas fed through the nozzle into the welding chamber. When a weld is being made, the welding block is held against the material being welded to maintain the welding apparatus perpendicular to the material. The rubber strip assists in maintaining this perpendicularity by accommodating any irregularities in the surface of the material. The rubber strip also prevents flow of molten weld material away from the vicinity of the weld spot. The bend in the gas exhaust passages prevent weld spatter from escaping from the welding chamber.

5 Claims, 2 Drawing Figures

PATENTED JUN 27 1972 3,673,373

Inventor:
Donald S. Lovett
By Richard C. Ruppin
Atty.

3,673,373

WELD SUPPORT FOR WELDING APPARATUS

BACKGROUND OF THE INVENTION

This invention relates to gas shielded metal arc apparatus and in particular to a welding support for such welding apparatus.

Gas shielded metal arc welding is a form of welding that uses a consumable electrode in which the electrode, the arc and molten weld are contained in a protective atmosphere of a shielding gas. The electrode is continuously driven through the nozzle of the welding apparatus to and consumed in the arc so that the electrode is deposited as part of the weld bead. The shielding gas is also fed through the nozzle around the electrode to establish a protective gas envelope about the arc. Due to forces caused by the arc, molten weld material is spattered away from the weld area.

When making a weld operation, the nozzle of the welding apparatus is brought into contact with one of the two pieces of material to be welded and sufficient pressure is applied to the material to assure metal to metal contact between the two pieces. It is desirable that the nozzle and the electrode be perpendicular relative to the plane of the work material so that the molten weld metal flows evenly around the spot being welded to provide a good weld and keep the rest of the material surface free of weld metal. It is also desirable to prevent the above mentioned weld spatter from escaping the immediate area of the weld and damaging any nearby apparatus. However, since it is necessary that the gas being directed into the welding chamber must also be exhausted to maintain continuous gas flow, exhaust means for the gas is necessary and such exhaust means typically also permits escape of weld spatter from the arc area.

SUMMARY OF THE INVENTION

It is the general object of the invention to provide a welding support for a gas shielded consumable electrode welding apparatus which maintains the welding apparatus and electrode in a perpendicular relationship to the material being welded and prevents escape of molten weld material by either spatter of flow from the vicinity of the weld.

The objects of the invention are accomplished by providing a welding apparatus support having a welding block provided with a relatively flat surface, a resilient rubber strip around the periphery of the flat surface, a welding chamber within the block and a plurality of gas exhaust passages connecting the welding chamber and the exterior of the block and having bends intermediate their extremities. A shielding chamber is affixed to the welding block around an opening into the welding chamber for receiving and holding a nozzle of the welding apparatus perpendicular to the flat surface of the welding block and enclosing shielding gas fed through the nozzle into the welding chamber. When a weld is being made, the welding block is held against the material being welded to maintain the welding apparatus perpendicular to the material. The rubber strip assists in maintaining this perpendicularly by accomodating any irregularities in the surface of the material. The rubber strip also prevents flow of molten weld material away from the vicinity of the weld spot. The bend in the gas exhaust passages prevent weld spatter from escaping from the welding chamber.

DESCRIPTION OF THE PREFERRED EMBODIMENT

Figure 1:
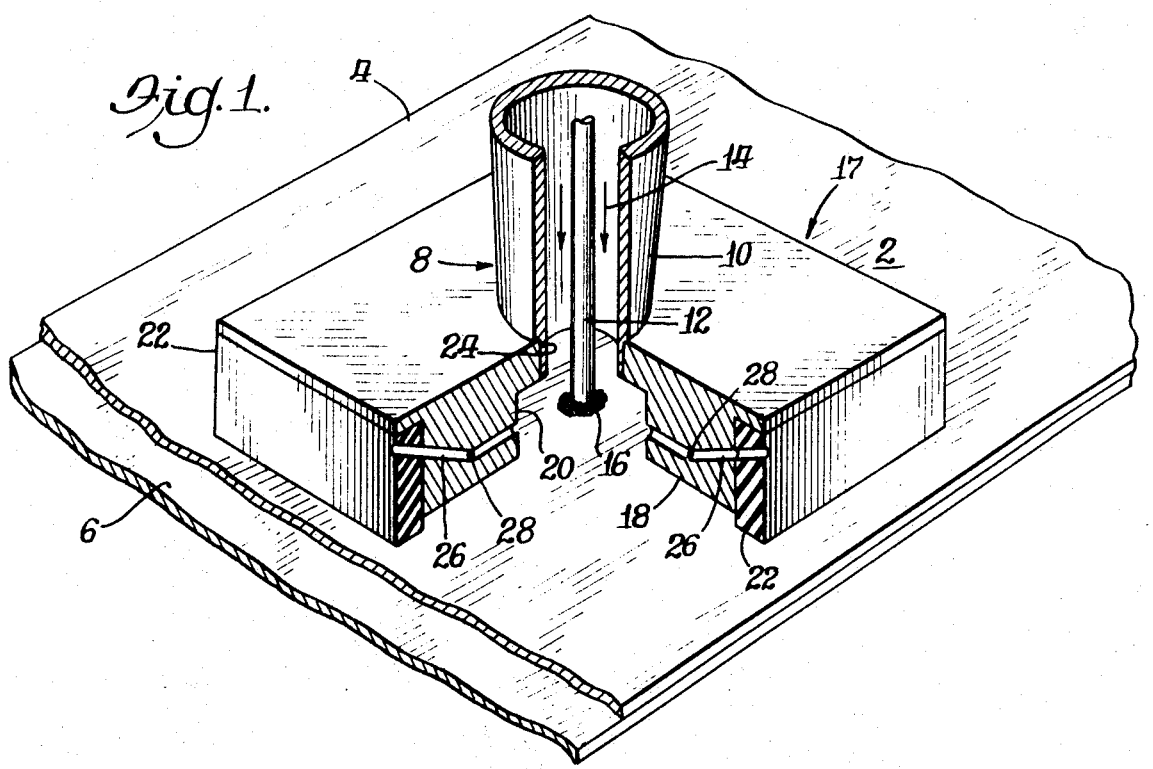
FIG. 1 is a perspective view partially broken away showing the welding support of the invention.

Referring to FIG. 1 of the drawings, a welding support 2 is shown in engagement with a sheet of material 4 to be welded to another sheet of material 6. Welding apparatus 8 includes an electrode 12 and nozzle 10 inserted within and affixed to the welding support 2. The electrode 12 is driven by the welding apparatus 8 through the nozzle 10 and into engagement with the material 4. Inert shielding gas 14, indicated by the arrows in FIG. 1, flows through the nozzle 10 around the electrode 12 and the molten weld puddle 16. Current from a suitable source of power is passed through the electrode 12 and an electrical connection (not shown) to material sheet 6 so that an arc is established between electrode 12 and the material sheets 4 and 6. Both the material sheets 4 and 6 and electrode 12 are thereby melted to form the molten weld puddle 16 which fuses the material sheets 4 and 6 together upon cooling.

Figure 2:
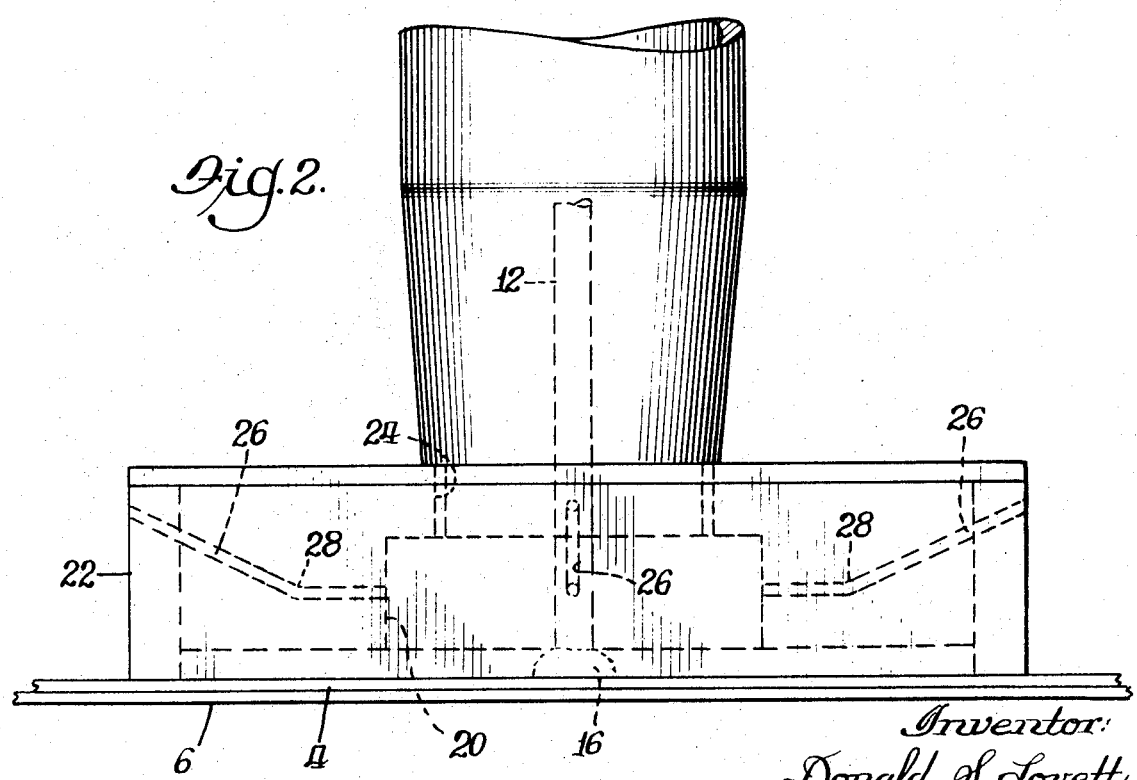
FIG. 2 is an elevational view of the welding support as affixed to the nozzle of a welding apparatus.

The welding support 2 includes a weld block 17 having a flat surface 18 engageable with the sheet material 4 and a welding chamber 20 enclosing the gas 14 and the arc between the sheet material 4 and the electrode 12. The welding support 2 also includes a resilient strip 22 such as sponge rubber affixed to the outer periphery of the weld block 17 and protruding slightly beyond the flat surface 18 when the welding support 2 is not in engagement with work material (see FIG. 2). As may be seen in both FIGS. 1 and 2, the weld block 17 has an opening 23 defined by the surface 24 and connecting the welding chamber 22 with the exterior surface 30 of the weld block 17 and thus with the interior of the nozzle 10 when the welding apparatus 8 is affixed to the welding support 2. The surface 24 engages and supports the nozzle 10 perpendicularly relative to the plane of surface 18 of weld block 17. The weld block 17 also has four exhaust passages 26, only three of which are shown in FIG. 2, extending from the welding chamber 22 to the exterior of the weld block 17 and through resilient strip 22. Bends 28 are located between the ends of the exhaust passages 26.

During a welding operation, the welding apparatus 8 is directed generally perpendicularly to the surface of the sheet material 4 so that the welding support 2 applies sufficient pressure against sheet material 4 to assure metal to metal contact between material sheets 4 and 6. The flat surface 18 of the weld block 17 engages the sheet material 4 and, particularly because of its large surface area relative to the cross section of the nozzle 10, assists in attaining a perpendicular relationship between the electrode 12, nozzle 10, and material sheet 4. The resilient strip 22 also assists in obtaining the perpendicular relationship by conforming to irregularities in the surface of the sheet material 4. At the same time, the resilient strip 22 seals the welding chamber 20 and the area under the flat surface 18 from the rest of the sheet material 4 and the atmosphere so that neither molten weld material from puddle 16 or gas 14 will escape underneath the welding support 2. Exhaust flow of gas 14 is controlled by exhaust passages 26. The bends 28 and exhaust passages 26 prevent spatter of molten weld material through the passages 26 to the exterior of the welding support 2.

It will be readily appreciated that a welding support and enclosure has been described herein for providing a perpendicular relationship between a welding electrode and the material being welded. The welding support also confines molten weld material and shielding gas around the welding area, subject only to a desired controlled exhaust of shielding gas.

While only a single embodiment of the invention is shown herein, it will be realized that many modifications thereof are feasible without departing from the spirit and scope of the invention. It is accordingly intended that the scope of the invention is not to be limited to the specific embodiment disclosed.

I CLAIM:

1. A welding support for a gas-shielded consumable electrode welding apparatus having an electrode and a gas discharging nozzle, said welding support engaging the surface of material being welded and comprising:

a weld block positioned in engagement with material being welded and including a welding chamber positioned over a weld location while a weld is being made, an opening in said block connecting the welding chamber and the exterior surface of the weld block away from the material being welded, and a gas exhaust passage in a wall of said block, said passage extending between the welding chamber and the exterior of said weld block, said passage having a bend intermediate its extremities whereby weld spatter is prevented from escaping from the welding chamber; and said gas discharging nozzle is supported on said weld block during a welding operation with the longitudinal axis of said electrode perpendicular to the surface of said material, said electrode extending through the opening and said gas discharging nozzle enclosing the opening.

2. The combination according to claim 1 wherein said weld block includes resilient means engaging the material being welded around a weld location for tightly sealing the weld block against the material.

3. A welding support for a gas-shielded consumable electrode welding apparatus having a gas and a gas discharging nozzle and creating a molten weld puddle during a welding operation, said welding support engaging material being welded and comprising:

first means engaging said gas discharging nozzle for enclosing said gas in a surrounding relationship to the molten weld puddle during a welding operation; and resilient means carried by said first means and engaging said material and said first means around said molten weld puddle in a gas-tight relationship for preventing flow of molten weld material from the vicinity of the molten weld puddle.

4. The combination according to claim 3 wherein resilient means comprises a rubber strip.

5. The combination according to claim 3 wherein said first means has a plurality of gas exhaust passages extending radially from the vicinity of the molten weld puddle, each of said passages having a bend whereby escape of molten weld material through the passages is prevented.

* * * * *